April 28, 1925.
W. W. RADU
ILLUMINATED INDICATOR FOR SCALES
Filed April 14, 1924
1,535,377
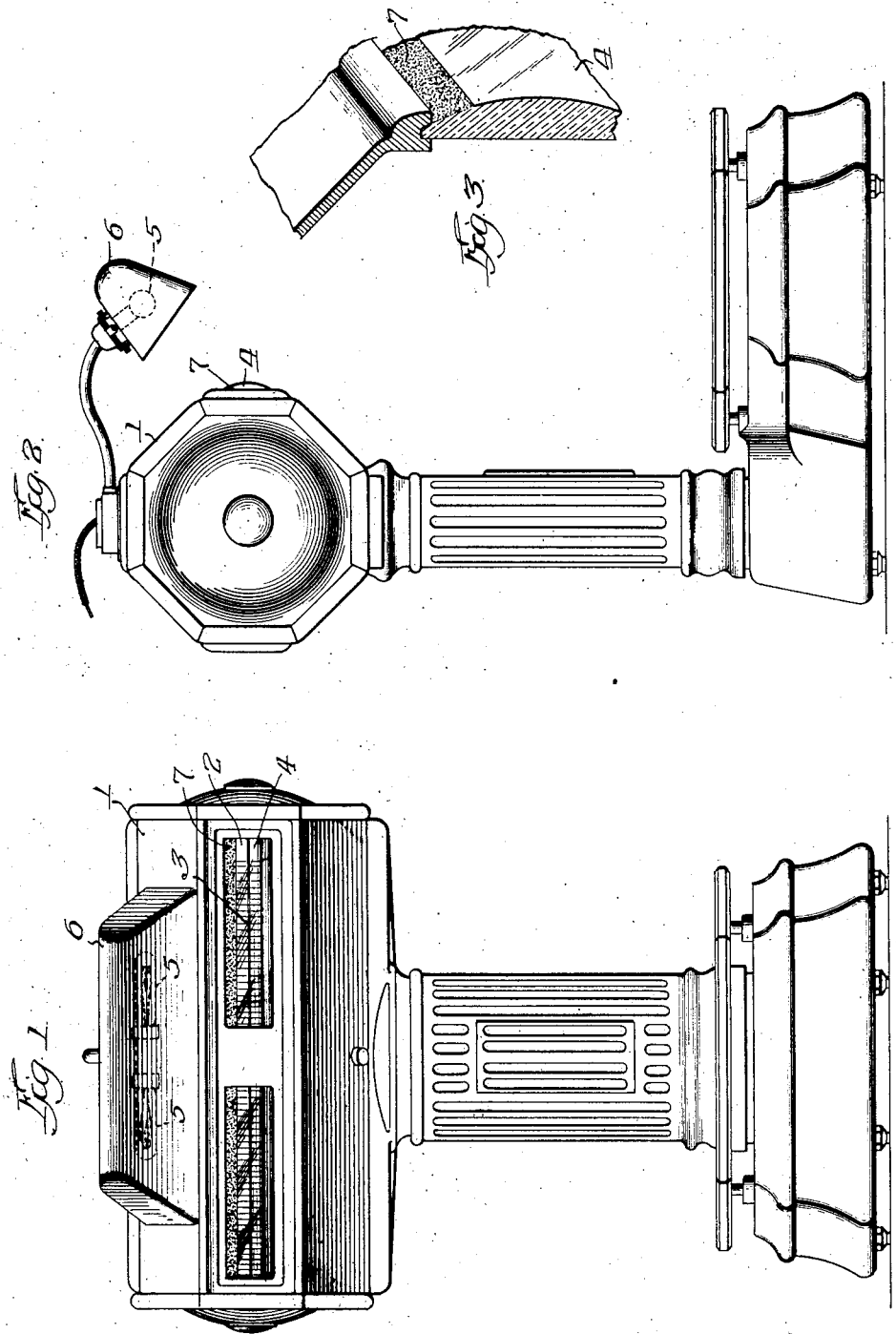
Inventor
Walter W. Radu Patented Apr. 28, 1925.

1,535,377

UNITED STATES PATENT OFFICE.

WALTER W. RADU, OF EVANSTON, ILLINOIS, ASSIGNOR TO SANITARY SCALE COMPANY, OF CHICAGO, ILLINOIS, A CORPORATION OF ILLINOIS.

ILLUMINATED INDICATOR FOR SCALES.

Application filed April 14, 1924. Serial No. 706,279.

*To all whom it may concern:*

Be it known that I, WALTER W. RADU, a citizen of the United States, residing at Evanston, in the county of Cook and State of Illinois, have invented certain new and useful Improvements in Illuminated Indicators for Scales, of which the following is a specification.

This invention relates to indicators for instruments of precision, such, for instance, as scales, and particularly to indicators employing a lens or lenses as a means of magnifying the readings and rendering them more readily observable. In indicators of this kind, and particularly when applied to commercial scales, which are often necessarily used under adverse light conditions, it has been the practice to associate with the instrument an artificial light source positioned with special reference to illumination of the scale, for instance, by positioning an electric lamp with a reflector above and in front of the lens. But it has been found that in doing this the convex surface of the lens or lenses receives the light at such angles of incidence that light is reflected directly to the eye of the observer in such a measure as to largely offset light reflected from the indicator, and thus detract from the facility with which the indicator may be read; and if the lens be restricted in vertical dimension, or shaded over the portion reflecting as aforesaid, illumination of the indicator is reduced to an undesirable degree.

The object of the present invention is to meet the difficulties above mentioned by avoiding objectionable reflection from the lens without reducing the illuminating area of the lens, and in realizing this object, that portion of the surface of the lens which lies in reflecting relation between the light source and the point or points which the observer's eye will naturally assume in reading the indicator, while maintained in the condition of translucency, is rendered non-reflective or left with such a reduced capacity of reflecting the light as to make it unobjectionable; the preferred method of accomplishing this result being by grinding, etching, frosting, or otherwise treating the reflecting zone of the convex lens surface to eliminate its smooth or polished condition. When this method of realizing the invention is resorted to, a substantial additional advantage accrues from the dispersion of that portion of the transmitted light which penetrates the corrected surface, and the consequent distribution of light over the indicator surface that renders the illumination more uniform throughout the surface to be observed, softens the light, and renders the operation of reading the indicator better in every way.

In order that the invention may be fully understood, the preferred embodiment thereof is illustrated in the accompanying drawing, in which—

Figure 1 is a front elevation, and Figure 2 a side elevation of a scale of known construction, in which the invention has been embodied; and Figure 3 is a detail view of a portion of the lens and its mounting, and showing the zone of the convex surface of the lens which is corrected to reduce reflection.

The instrument selected for illustrating the invention is a weighing scale of the type in which a cylindrical chart, mounted in a chart housing 1, is rotated to bring its surface in view through a window 2, so that readings upon such surface can be observed in their relation to a sight line 3. It has been the custom heretofore to glaze the window 2 with a plano-convex prism or lens 4 that facilitates observation of the readings; and to illuminate the indicator it has also been the practice to provide the scale with a light source 5 located above and forward of the lens 4, and provided with a reflector 6 that will direct the light from the lens at an agle that will cause the light beam, in passing through the lens, to be refracted and reach the indicator. But the upper portion of the convex surface of a lens in this situation, relatively to a light source, has been found to reflect such a substantial proportion of the light as not only to detract from the illumination of the indicator, but to further neutralize the illuminating effect by passing directly to the eye of the observer. To remedy this, the present invention provides a zone or area 7 upon the convex surface of the lens 4, which is of such a character that it will interrupt light rays and prevent reflection thereof to such a substantial degree as to eliminate the objection referred to, but not only without interrupting the transmission of light through this portion of the lens, but with the actual effect of increasing such transmission by the interruption, or by the effect of the modified surface in refracting more of the light inward through the lens. Moreover, the light which is thus refracted and directed to this portion of the lens instead of being reflected from the surface, is so distributed over the indicator surface as to render very much more uniform the illumination of such surface as a whole.

The best method of treating the area 7 of the lens 4 and securing the results described is by grinding, sand-blasting, or otherwise roughening the surface so as to break it up and transform it from its original condition of glaze or polish to a condition of minute sub-surfaces at such diverse angles relatively to the impinging light as will result in diffusion of the beam and refraction and transmission of most of the light that otherwise would impinge at such an angle of incidence as to be wholly reflected. The dimension of the treated zone 7 in the horizontal direction or direction transverse to that of the light will naturally be coincident with the portion of the lens that is effective as to the indicator to be read, and the vertical or other dimension will be determined primarily by the area of the lens surface which lies within the reflecting angle between the light source and the range of positions which the observer's eye will naturally assume in the use of the scale.

I claim:

1. In an instrument of precision having an indicator presented for reading from an observer's position, and a light source positioned to illuminate said indicator, a lens interposed between said indicator on the one hand and said light source and observer's position on the other hand, and constructed with a translucent but light-diffusing area over that portion of its surface which lies in light-reflecting relation between the light source and the observer's position.

2. In an instrument of precision having an indicator presented for reading from an observer's position and a light source positioned above and forward of said indicator, a lens positioned in front of said indicator and having a convex outer surface, a portion of which assumes an angle relative to the direction of light from said source, which refracts the light inwardly upon the indicator, other portions of said surface being adapted to transmit light from the indicator to the observer's position, and that portion of the refracting surface which lies in reflecting relation between the light source and the observer's position being rendered non-reflecting, light-diffusing, and translucent.

3. In an instrument of precision, an indicator positioned for reading from an observer's position, and a lens positioned in front of said indicator, having a convex surface, and a zone of said surface non-reflective in an outward direction and translucent to light from without.

4. In an instrument of precision, an indicator positioned for reading from an observer's position, and a lens positioned in front of said indicator, having a convex surface, and a zone of said surface non-reflective in an outward direction but translucent and refractive in an inward direction.

Signed at Chicago, Illinois, this 9th day of April, 1924.

WALTER W. RADU.